| | A | H | R | S | T | W | CONDITION OF THE COUNTING CHAIN |
|---|---|---|---|---|---|---|---|
| | | | R | | | | |
| 1.Jmp. | A | | R | S | | | RS |
| | | | | S | | | |
| 2.Jmp. | A | H | | S | | | S |
| | | H | R | S | | | |
| 3.Jmp. | A | H | R | | T | | RT  ENERGIZED |
| | | H | | | T | | |
| 4.Jmp. | A | | | | T | | T |
| | | | R | | T | | |
| 5.Jmp. | A | | R | S | T | | RST |
| | | | | S | T | | |
| 6.Jmp. | A | H | | S | T | | ST |
| | | H | R | S | T | W | |
| 7.Jmp. | A | H | R | | T | W | RTW |
| | | H | | | T | W | ENERGIZED |
| 8.Jmp. | A | | | | T | W | TW |
| | | | R | | T | W | |
| 9.Jmp. | A | | R | S | T | W | RSTW |
| | | | | S | T | W | |
| 10.Jmp. | A | H | | S | T | W | STW |

Fig.5

| Fig.3b | Fig.3c |
|---|---|

Fig. 4a      Fig. 4b

United States Patent Office 3,059,057
Patented Oct. 16, 1962

3,059,057
CONNECTORS CONTROLLED BY MARKERS AND HAVING ACCESS TO P.B.X TELEPHONE LINES
Hans-Joachim Lurk and Kurt Laas, Munich, Germany, assignors to Siemens & Halske Aktiengesellschaft Berlin and Munich, a corporation of Germany
Filed Mar. 11, 1959, Ser. No. 798,752
Claims priority, application Germany Mar. 14, 1958
9 Claims. (Cl. 179—18)

This invention is concerned with a circuit arrangement for connectors controlled by marker devices and having access to private branch exchange telephone lines. The invention may be considered in the nature of a further development on the circuit arrangement disclosed in co-pending application Serial No. 797,235, filed March 4, 1959.

The above noted copending application discloses a circuit arrangement for connectors having access to private branch exchange lines, having markers common to a plurality of connectors for controlling the setting thereof, wherein the marking of connector bank contact groups is effected over multiples of diverse auxiliary contact banks by the tens digit while the marking of individual subscriber lines and of private branch exchange lines is effected by the units digit. The invention according to the copending application provides means whereby the marker marks the group contacts in the multiple of an auxiliary contact bank of the connector, individual lines being subsequently tested by way of such auxiliary contact bank by a relay set associated with a seized connector, while the individual subscribed lines and private branch exchange lines are marked in the multiple of another auxiliary contact bank of the connector by the same testing relay, in such a manner, that the individual subscriber lines are marked directly while the private branch exchange lines are by switching means merely marked preparatorily, the condition of the private branch exchange lines being ascertained by a testing circuit which is simultaneously produced by way of the first auxiliary wiper, whereupon the testing means completes the marking circuit for the private branch exchange lines, upon ascertaining an idle line, for the purpose of stopping the switch with the wipers thereof in engagement with the bank contacts of the idle private branch exchange line.

The present invention provides in the marker multiple of the connector capacitors each of which is common to the lines of a private branch exchange number, such capacitor being charged, depending upon the evaluation of the corresponding private branch exchange number to a given voltage, thereby storing the number thereof, the connector, incident to hunting with respect to the private branch exchange lines preparatorily testing the charge of the respective capacitor in the marking circuit of the private branch exchange numbers, the marking circuit however becoming operatively effectively solely depending upon a testing circuit which is simultaneously established and extends by way of an electronic amplifier, preferably a transistor, and over an individual test conductor, to ascertain the condition of the respectively connected private branch exchange line.

In addition to the advantage which is also present in the arrangement according to the copending application, namely, avoidance of "cross-testing" in the event that several markers are simultaneously operative in parallel with respect to connectors respectively associated therewith, the present invention provides the further considerable advantage of eliminating standby outlets (bank contacts) for lines to be added to private branch exchange numbers per contact group (decade), permitting instead distribution thereof in any desired spare bank contacts in all decades in the entire contact bank of the switch. Such standby bank contacts for the private branch exchange numbers are preferably placed in a predetermined decade, for example, decade "0," and are distributed to the existing private branch exchange subscribers as may be required. It is understood, of course, that these standby bank contacts can be placed in other decades. This is in accordance with the invention possible because it is after the setting of the connector wipers to the bank contacts of the first line of a private branch exchange number, which may in a sense be considered as the zero position, and after the charging of the corresponding common capacitor which is affected in such position, immaterial in which decade the lines of the private branch exchange number are disposed. Since the connector always tests incident to its hunting to the charge of the corresponding capacitor, the private branch exchange lines may be arbitrarily distributed over the entire contact bank of the connector or over the bank contact multiple thereof.

A considerable problem in the testing of a connector in connection with private branch exchange lines resides in the requirement according to which the connector must always be stopped with the wipers in engagement with the bank contacts belonging to the last line, regardless of whether the corresponding line is busy or idle. This problem is in accordance with the invention solved by connecting the marking circuits of all except the last of the lines of a private branch exchange number in common to one plate of charged capacitor, and after the opening of the marking circuit by a transistor over the test relay and a suitably poled rectifier, effecting partial discharge of the capacitor against a given partial voltage by sufficient current of predetermined direction, preferably to half of the charge, while connecting the marking circuit of the last private branch exchange line to the other plate of the charged capacitor and discharging it against the same partial voltage by oppositely directed current by way of other rectifiers and avoiding the transistor.

The various objects and features of the invention will be brought out in the course of the description which will be rendered below with reference to the accompanying drawings. In the drawings.

FIGS. 2a, 2b, 3a, 3b, 3c and FIGS. 4a, 4b illustrate an embodiment of the invention applied to a telephone system having in all selection stages rapidly operating rotary switches, especially motor-operated rotary switches, and having markers which are respectively associated each with a group of switches; and FIG. 5 shows how FIGS. 3b and 3c are to be assembled.

If the individual subscriber A (FIG. 1) wishes to extend a call to the individual subscriber B, then upon removal of the receiver, a circuit is produced in customary manner extending over the closed loop of the two-conductor subscriber line TL to the subscriber line circuit TSch, causing the line finder AS to hunt for the calling line. Common call distributors AO are associated in known manner with the line finders. The line finder AS is fixedly connected with a first group selector IGW, such connection including a battery feed transmissions SpUe. With the battery feed SpUe there is associated a pulse storer JW, hereinafter called pulse repeater, which stores the trains or series of numerical pulses (digits) transmitted from the calling station and transmits such pulses without conversion to a marker ES after such marker has been prepared for the receipt thereof. After the call is thus extended to the battery feed transmission, the subscriber A receives the dial tone advising him to proceed with the dialing of the desired number. By means of his dial, he thereupon transmits the corresponding series of impulses. When the storing in the pulse repeater JW commences, a signal is given from the battery feed transmission SpUe to the connecting switch of the marker ES1 of the first group selector IGW which causes the connecting switch to hunt for and to establish connection with the corresponding battery feed transmission. After the connection has been established, the pulse repeater is caused to commence with the transmission of the series of the pulses which had meantime been stored. The first series of pulses passes into the marker ES1 and is evaluated by the latter in the form of optional connecting a marking potential to one out of ten marking lines. The selected marking line, by way of a marking multiple in an auxiliary contact bank of the first group selector, causes the setting thereof to the decade determined by the marking line. The different decades lie in the contact bank of the rotary selector of this selector stage as in all other selector stages one in back of the other. After the decade selection, the group selector automatically starts hunting in the corresponding decade, thereby causing seizure of a second group selector IIGW. The marker ES2 of the second group selector is now in its turn operatively affected by the battery feed transmissions SpUe. As soon as its connecting switch has found the seized line, the second series of current pulses is transmitted from the pulse repeater. It passes to the marker ES2 which again evaluates it by selecting a given marking line in the same manner as in the case of the first group selector. The second group selector is set to the corresponding decade. It thereupon hunts for an idle third group selector IIIGW; the battery feed transmission SpUe now causes actuation of the connecting switch of the marker ES3 associated with the third group selection stage. As soon as the latter has found the seized trunk line, the third series of pulses is transmitted from the storer JW and passes into the marker ES3. The latter evaluates it in the same manner as the preceding group selectors. The third group selector seizes an idle connector OFLW. Battery feed relay sets SpUL are inserted in the trunks to the connector, permanently associated therewith.

Figure 1:
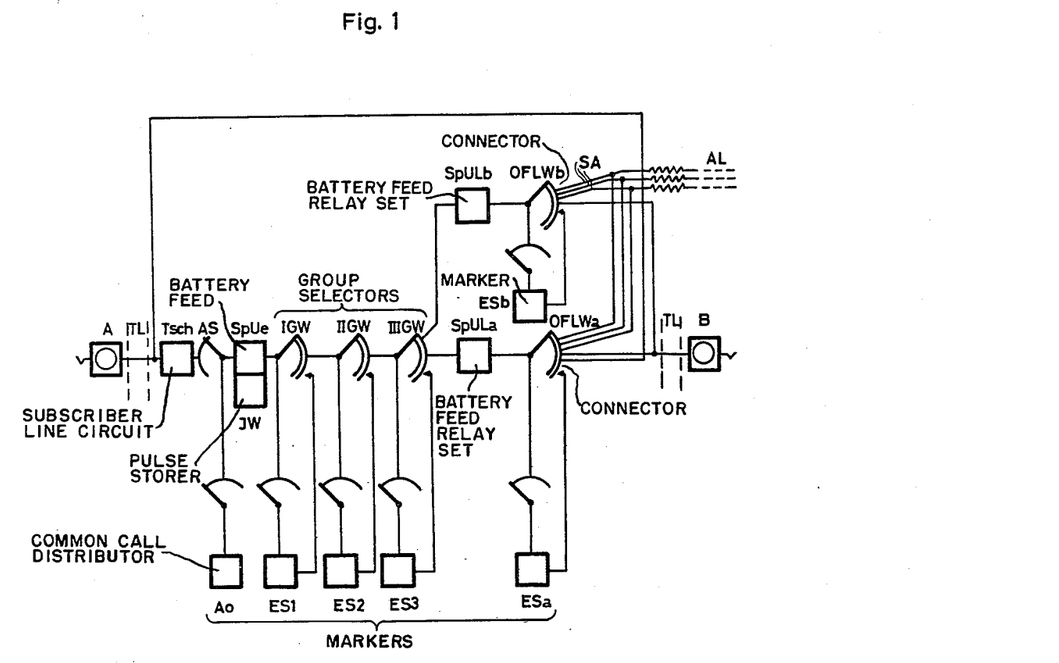
FIG. 1 is a block diagram to aid in explaining how calls are extended in such a telephone system.

The group of connectors connected to the decade reached by the third group selector, over which group the desired subscriber B is reached in the customary manner, may consist of a large number of connectors. For this reason, a common marker ESa or ESb is associated in each case with a connector group OFLWa and OFLWb, respectively. If one marker should become inoperative, the other marker takes over the marking multiple of the inoperative marker. If the third group selector for instance seizes the trunk line extending to an idle connector OFLWa over its battery feed relay set SpULa, a demand criterion (in the form of voltage over a line conductor) is transmitted from the battery feed transmission SpUe at the beginning of the connecting path to the marker ESa of the seized connector, such demand criterion causing the connecting switch to connect the marker to the seized trunk line. The marker is thereupon ready for receiving the next to the last digit from the impulse repeater JW. The impulse repeater transmits the tens digit in the same manner as to the group selectors, to the marker ESa which evaluates it in the selection of a given marking line in the decade marking multiple of the connector. This results in the setting of the connector to the corresponding decade. Thereupon the marker is again released; however, in the battery feed relay set SpULa of the connector, the tens series already transmitted is retained in a local circuit. The connecting switch remains for the time being connected with the seized connector OFLWa.

If the last digit (units digit) is already stored in the impulse repeater, voltage is again present in the battery feed transmission SpUe associated with the impulse repeater, as a demand criterion on the a line conductor, which again affects the marker ESa. If the connecting switch is no longer on the seized trunk line to the connector, it is again actuated to establish connection therewith. Thereupon the impulse repeater transmits the units digit to the marker ESa, where it is again evaluated, that is, a given marking line is selected; but after the units digit, the marking lines are shifted from the decade marking multiple to another marking multiple, namely, the single-line marking multiple. Depending upon this marking, the connector is set to the desired bank contacts at which the calling subscriber's line is connected with the desired subscriber B. After the setting of the connector, its seizure circuit is maintained and the marker ESa is released. In the battery feed relay set SpULa, there is thereupon effected the testing of the line B as to whether it is idle or busy. Depending on the results of this testing, the feed relay set of the connector then effects the remaining known operations, such as checking, initial ringing, further ringing, busy signal transmission, etc.

The release of the connection is effected when the calling subscriber restores the receiver.

If the subscriber A wishes to extend a call to a private branch exchange subscriber SA, the call is up to the connector stage extended in the same manner as a call to an individual line subscriber B. However, the marker ESa of the connector now marks in the latter a private branch exchange subscriber. The connector, after the setting thereof controlled by the marking, begins to hunt for an idle one of the lines of the private branch exchange subscriber.

The switching operations, insofar as they are important for an understanding of the invention will now be described in detail with reference to FIGS. 2a, 2b, 3a, 3b, 3c, 4a and 4b.

Figure 2A:
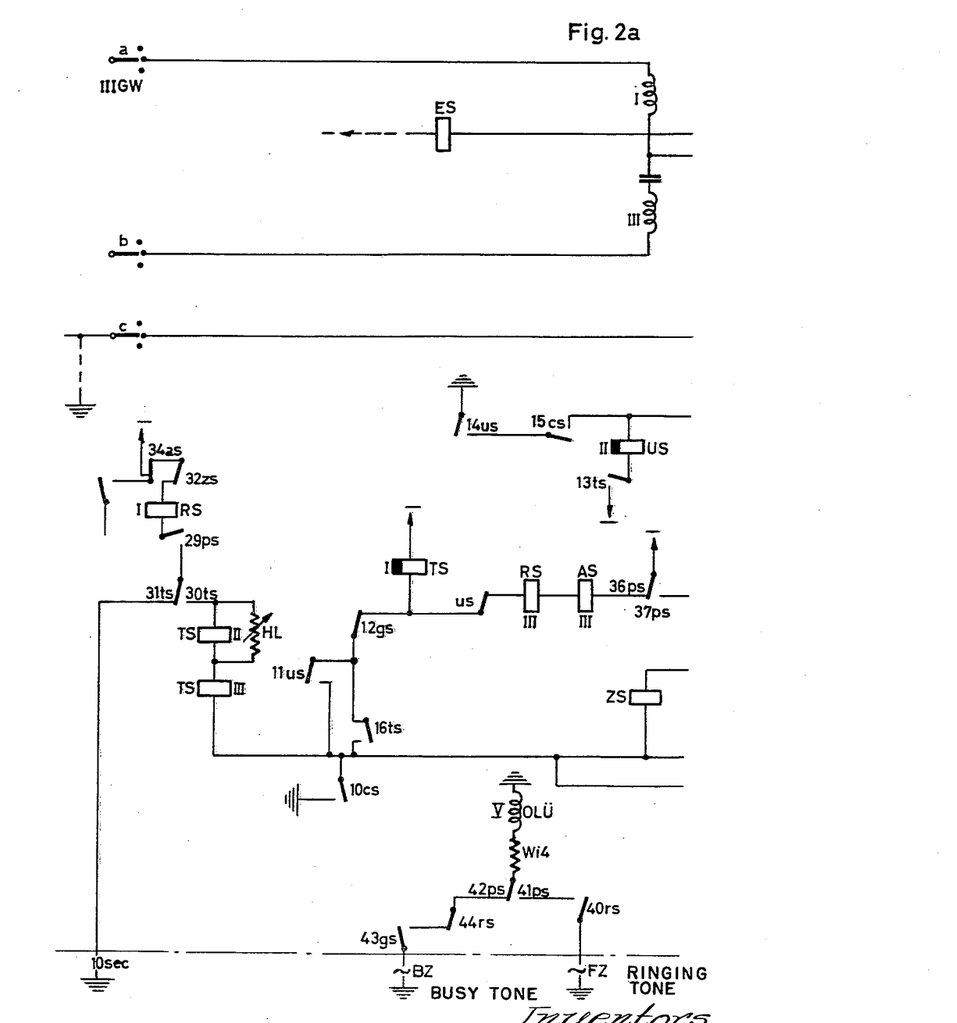
Figure 2B:
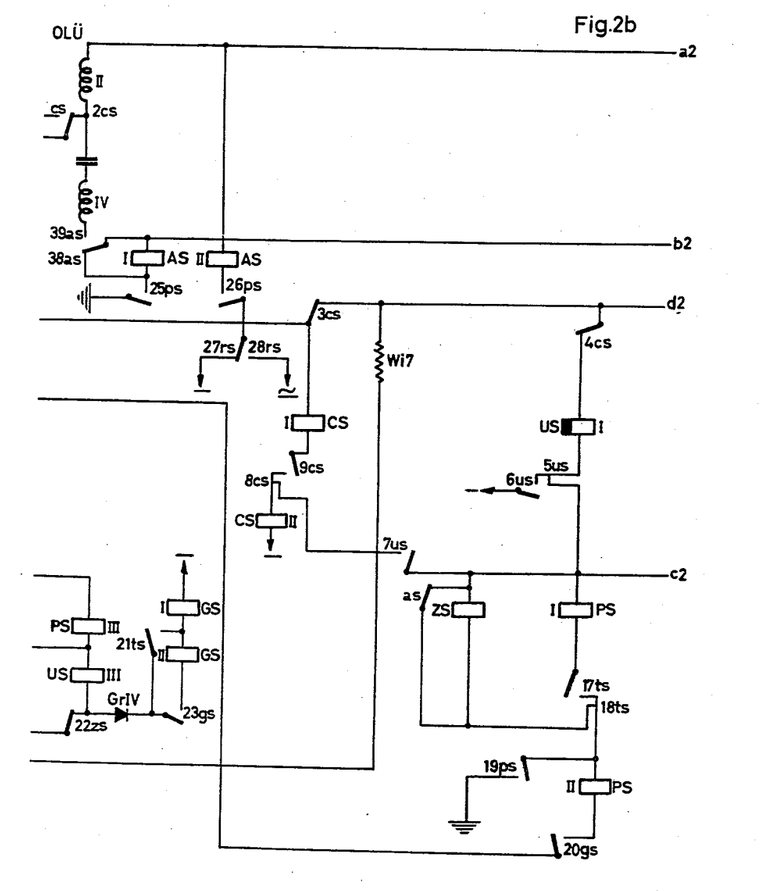

FIGS. 2a, 2b show the circuit of the battery feed relay set SpULa, corresponding to identically reference figures in the previously mentioned copending application.

Figures 3A, 3C, 5:
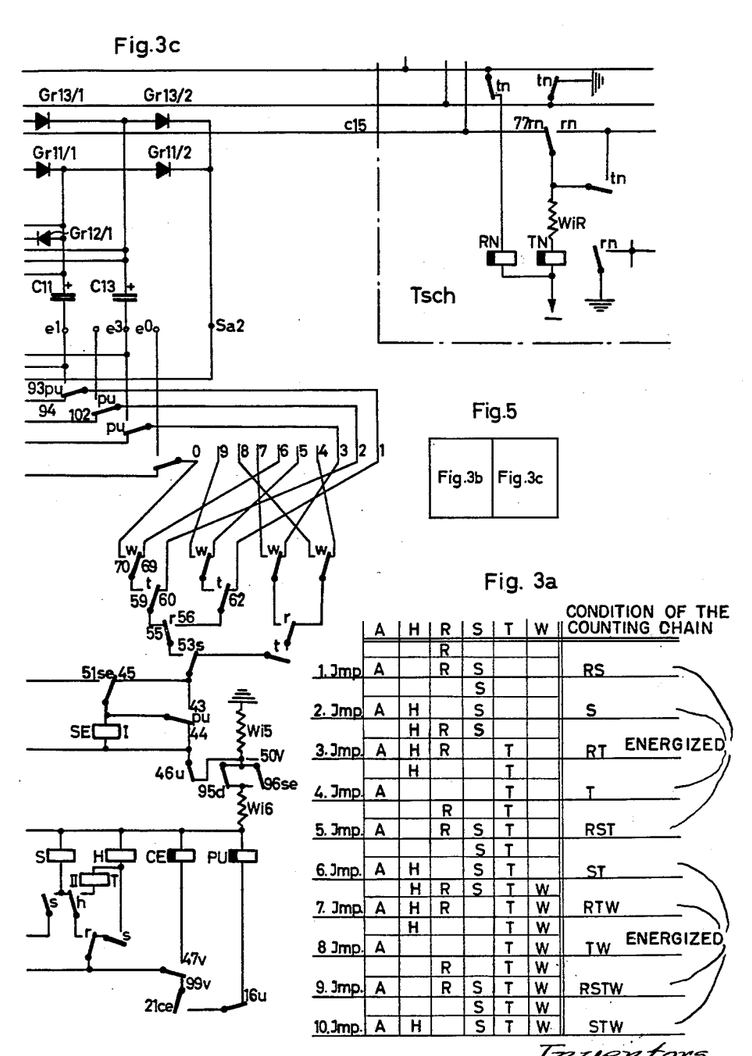
Figure 3B:
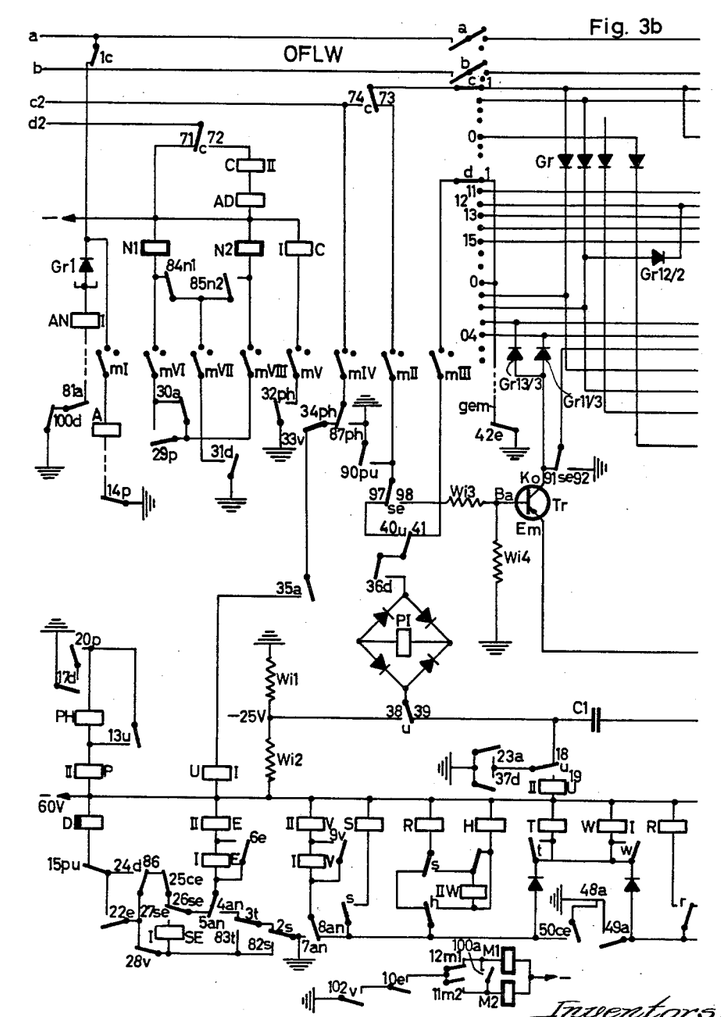

FIGS. 3b and 3c show the circuit of the marker ESa with its connecting switch and the connector OFLW.

Figure 4A:
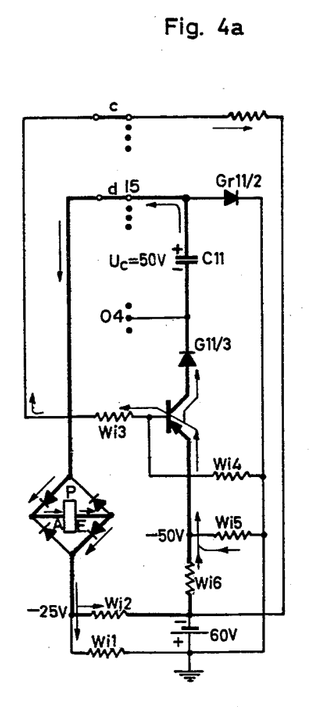
Figure 4B:
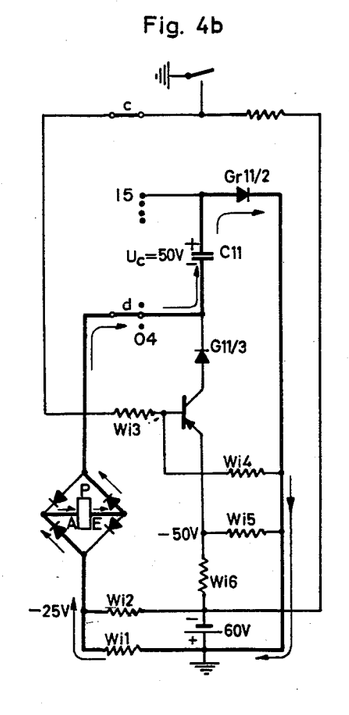

FIGS. 4a and 4b show two important circuits extracted from FIGS. 3b and 3c, such circuits resulting incident to the testing of the connector, in the marker circuit, upon the lines of a private branch exchange number.

A description of the switching operations effected in the selection stages preceding the connector will be omitted as it is not required for an understanding of the invention.

It may be mentioned, however, that the switches in all selection stages as well as the switches for connecting the markers, are known motor controlled rotary switches with individual drives. The wipers of such a motor switch are driven by a motor comprising two field coils which are displaced by 90°, and an unwound armature disposed at the point of intersection of the axes of the field coils. The field coils are alternately energized to rotate the armature. The switch shaft carrying the wipers is driven by a gear wheel rotated by a pinion controlled by the armature. The field coils are switched-in alternately by means of cam contacts governed by the switch shaft. Simultaneous energization of both field coils stops the rotation of the wipers of the switch.

Extension of a call to a private branch exchange subscriber will be described first. Two private branch exchange subscribers are assumed to be provided according to FIGS. 3b and 3c, one of these subscribers being reached by the terminal call number 11 and the other by the terminal call number 13. The private branch exchange subscriber with the terminal call number 11 has four exchange lines, three of which are connected to the back contacts 11, 12, 15 of decade 1 and the last being connected to the bank contacts 04 in decade 0. Outlet 12 is connected as a night-call number. The private branch exchange subscriber having the terminal call number 13 has three exchange lines, two of which are connected to bank contacts 13 and 14 in decade 1 and the last being connected to bank contacts 03 in decade 0.

A connection to the private branch exchange subscriber having the terminal call number 11 will now be described.

When a third group selector has found an idle connector OFLW, there will be after the switching-through of the two line conductors over the wipers *a, b, c* of the third group selector IIIGW (FIG. 2a), voltage from the feed transmission SpUe at the incoming end of the connection, on the *a*-conductor, which is effective over the galvanically extended line conductor in the feed relay set of the connector, as a demand signal to the marker of the connector, in the circuit:

(1) (FIG. 2a) —, *a*-conductor, OLUI, 2cs, OLUII, conductor *a*2, (FIG. 3b), 1c, Gr1, ANI, 81a 100d, +

Relay AN energizes in this circuit and connects relay E:

(2)    +, 2s, 3t, 4an, EI+II, —

Relay E short-circuits its winding I by actuating its contact 6e, thus imparting thereto a slow-to-release characteristic. Relay AN connects relay V:

(3)    +, 7an, VI+II, —

Relay V actuates contact 9v to short-circuit its winding, thus becoming slow-to-release and thereby remaining actuated during impulse series. Relay E connects the motor of the connecting switch:

(4)    +, 102v, 10e, cam contact 12m1, M1, —

The connecting switch operates since after energization of the field coil M1, cam contact 12m1 is opened and 11m2 closed, thereby operatively connecting the field coil M2:

(5)    +, 102v, 10e, 11m2, M2, —

The connecting switch continues rotation of its wipers mI to mVIII (FIG. 3b) until it finds the involved battery feed transmission at the incoming end of the connection, in which there is voltage on the *a*-conductor, such voltage causing upon testing operation of the connecting switch energization of relay A:

(6) (FIG. 2a) —, *a*-conductor, OLUI, 2cs, OLUII, conductor *a*2, (FIG. 3) 1c, wiper mI, A, 14p, +

The operation of the connecting switch is stopped by way of contact 100a. Relay A interrupts at contact 81a the circuit for relay AN which restores and causes restoration of relay E by opening contact 4an. Relay A connects relay CE (bottom left in FIG. 3c):

(7)    +, 49a (bottom right in FIG. 3b), over to FIG. 3c, 47v, CE, —

The transmission of the penultimate impulse series (tens digit) starts immediately thereafter in the feed transmission at the incoming end by impulse-wise interruption of the voltage on the *a*-conductor. Relay A in the marker ESa (FIG. 3b) restores impulse-wise, transmitting the impulses to the counting chain comprising the relays H, S, T, W, which evaluates the impulses by connecting a number of relays after each impulse series while avoiding connection of other relays. Ten different impulse combinations corresponding to the digits 0, 1 . . . 9 can be marked in this manner. The condition of the counting chain at the end of the individual impulses of an impulse series, when relay A is always energized, is apparent from the table shown in FIG. 3a. The circuits effected by the counting chain can be easily determined by tracing them in accordance with the information contained in the table.

In accordance with the stated assumption, the digit 1 was transmitted as the tens digit; relay A in the marker therefore restores only once and immediately energizes again. Relays R and S are, as shown in the table, energized at the conclusion of this impulse series. Since relay A continues energized after this impulse series, relay AN will be caused to restore due to the opening of contact 81a. Restoration of relay AN causes restoration of relay E (see circuit "2"). Owing to the energization of relays R and S, the marker conductor 1 will be at the voltage divider such as Wi5/Wi6 (lower left of FIG. 3c) at a potential of —50 v.:

(8) Wi5/Wi6 (—50 v.), 46u, 44pu, 45se, 53s, 56r, 62t, marker conductor 1

Since relay A is continuously energized, relay V will restore after the lapse of a certain interval. Relay V, at contact 47v, interrupts the circuit for the relay CE which restores with considerable delay. During the restoration interval of relay CE, relay U (bottom left in FIG. 3b) is connected to the incoming conductor *c*2, to which is connected at the feed relay set SpULa of the connector, relay US from the preceding group selector:

(9) +, *c*-wiper (IIIGW; FIG. 2a), *c*-conductor, (FIG. 2b) 3cs, 4cs, USI, 5us, conductor *c*2, (FIG. 3b) wiper mIV, 34ph, 33v, 35a, UI, —

Relays U of the marker and US of the preceding feed relay set energize in this circuit. These two relays store the condition of the effected decade selection. Relay US in the feed relay set is held independently of the marker, in the following circuit:

(10) +, *c*-wiper (IIIGW), *c*-conductor, 3cs, 4cs, USI, 6us, —

Relay U in the connector is held locally by way of its second winding IIU, lower right in FIG. 3b:

(11)    +, 23a, 19u, IIU, —

Relay U opens contact 16u, thereby preventing energization of relay PU (bottom left in FIG. 3c).

Upon restoration of relay V, relay E is connected again:

(12) +, 82s, 28v, d86, 25ce, 26se, 5an, EI+II, —

Relay E connects relay D (bottom left in FIG. 3b):

(13)    +, 82s, 28v, 22e, 15pu, D, —

Relay D starts operation of the motor of the connector (field coils N1 and N2; top left in FIG. 3b):

(14) +, 31d, wiper mVII, cam contact 84n1, N1, —

Upon energization of the field coil N1, cam contact 84n1 is opened and cam contact 85n2 is closed deenergization of N1 and energization of N2. The field coils are in this manner alternately energized by the alternately actuated cam contacts. The connector operates to select the marked decade 1. Relay D is held actuated after opening of the contact d86, in the circuit:

(15)    +, 82s, 28v, 24d, 15pu, D, —

Relay U switches the testing relay P (winding P1; FIG. 3b) of the marker to the decade marking circuit at the *c*-wiper of the connector and connects the capacitor C1 (lower right in FIG. 3b) with the contact pyramid to the marker lines. It may be mentioned at this point that the capacitor C1 was upon energization of relay A charged to the battery voltage —50 v.:

(16) +, 23a, 18u, C1, 46u, 95d, Wi5/Wi6, —

As soon as the *c*-wiper of the connector reaches the group contact 1 ahead of the decade 1, relay F will be energized by the discharge current of capacitor C1:

(17) C1, 39u, PI, 36d, 40u, 97se, wiper mII, 73c, *c*-wiper (1), Gr1, 94pu, marker conductor 1, 62t, 56r, 53s, se45, pu44, C1

Relay P energizes placing by closure of its contacts 29p a bridge across the two field coils N1, N2, in a circuit including wipers mVI and mVIII of the connecting switch, for stopping the operation of the connector. Opening of the contact 14p causes deenergization of relay A. Relay P is for the time being held over its second winding IIP; near bottom left in FIG. 3b:

(18)    +, 17d, 20p, 13u, PII, —

The holding circuits of the relays R and S of the counting chain are interrupted after restoration of relay A due to opening of contact 49a. This effects also restoration of relays D, U and P. The marker is in this manner released and is made available for receiving the last selection impulse series (units digit). Assuming that the units digit has been stored in the feed transmission at the incoming end of the connection path, voltage will again be present at the $a$ conductor as a demand criterion for the marker ESa of the connector, causing energization of the relays AN, E and V. Relay E connects the motor of the connecting switch (field coils M1 and M2; bottom right in FIG. 3b) and such switch connects the marker again with the involved feed transmission SpUe, whereupon the testing relay A in the marker energizes. Relay A again disconnects relay AN. Relay CE is again connected by the actuation of relay A.

Current impulses of the units series are now received from the feed transmission SpUe, causing impulse-wise interruption of the voltage on the $a$-conductor. Relay A follows the impulses by restoration and energization. Relay A controls the counting chain. Since 1 has been assumed as the units digit, relays R and S will again be actuated at the end of such impulse series, as shown in the table FIG. 3a, and the marker line 1 is accordingly switched through. Relay E deenergized with delay after energization of relay S due to opening of contact 2s. Relay V is however held during the impulse series:

(19)    +, 48a, 50ce, 8an, 9v, VII, —

It is in this connection assumed that the impulse series from the preceding transmission arrives during the restoration interval of relay V. Upon conclusion of the impulse series, relay A will continue to be energized. Relay V accordingly restores with a delay and relay E restores thereafter with a considerable delay. After restoration of relay V, winding I of relay U will again be connected with the incoming c2-conductor by way of contacts 35a, 33b, 34ph and wiper mIV. However, since the ground potential is in the feed relay set (FIGS. 2a, 2b) disconnected from this conductor — relay U having itself disconnected from the c2-conductor by opening of contact 5us — the testing will remain without any result. Relay U in the marker does not energize. Relay PU (bottom left in FIG. 3c) energizes now with delay:

(20)  bottom right in FIG. 3b, +, 49a, 99v, 21ce, 16u, PU, —

Relay SE (winding SE1; near bottom left in FIG. 3c) energizes now by way of the c-wiper of the connector, in a circuit:

(21)   +, upper center in FIG. 3b, 90pu, mII, 73c, c-wiper (1),

Gr13/1, Gr13/2
---
Gr11/1, Gr11/2 sa2, 91se, Gr11/3, 93pu, marker conductor 1, 62t, 56r, 53s, 43pu, SEI, 46u, Wi5/Wi6, —50 v.

This circuit is interrupted by relay SE at contact 91se but the charging of the capacitor C11 assures the actuation of relay SE in the circuit:

(22)   +, 90pu, wiper mII, 73c, c-wiper (1), Gr11/1, C11, e1, 93pu, marker conductor 1, 62t, 56r, 53s, 43pu, SEI, 46u, —50 v.

Relay SE holds itself in series with relay E over its second winding, bottom left in FIG. 3b:

(23)     +, 82s, SEII, 27se, 5an, EI+II, —

Relay E energizes in this circuit.

As a consequence of the energization of relay SE, in the connector marker, the connector must in the subsequent individual step setting seek an idle line in a predetermined private branch exchange number. Just what private branch exchange number is involved, is stored by the charge of the capacitor C11 (top left in FIG. 3c). Attention may be called to the fact that the capacitor C11 was charged depending upon the selected tens digit (position of the c-wiper of the connector) and the selected units digit (switching-through of the marking conductor 1), that is, the capacitor C11 can be charged only responsive to the selection of the number "11."

The last position (line) of the private branch exchange subscriber is definitely and positively defined despite the fact that the bank contacts for the individual lines belonging to the private branch exchange subscriber may be distributed over the entire connector multiple, since all bank contacts of the private branch exchange subscriber excepting bank contacts for the last line are extended from the d-contact bank of the connector to the plus-plate of the capacitor C11 while the last line is connected to the minus-plate thereof. The private branch exchange line group "11" is by the connector always subjected to hunting, beginning with the marker step or position "11" which may be considered as a zero position, by the testing of the connector solely on the charged capacitor C11. If the private branch exchange subscriber "13" is called, the connector begins hunting in similar manner from the marker position "13," thereby always testing on the charged capacitor C13. In case the beginning of the lines of a third private branch exchange number lies in another decade, the switch is first set by the decade selection to the corresponding group contact of such decade and thereupon hunts from the corresponding marker step, always testing on the respectively associated previously charged private branch subscriber capacitor.

After the charging of the capacitor C11, relay CE (left bottom in FIG. 3c) will restore with considerable delay, opening at contact 21ce the circuit for relay PU. Relay PU restores, thereby operatively connecting relay D since relay E has already energized in series with the holding winding II of relay SE (see circuit "13"). The motor of the connector is operatively connected by way of contact 31d and the connector accordingly starts operating.

It may be emphasized again that the marker is switched over by the relay SE so that the connector seeks over its wiper $d$ only the charge of the capacitor C11, since the marker conductors are in the d-contact bank disconnected from the bank contacts of the private branch exchange number. The individual step or position numbers therefore are in the hunting operation of the connector without significance.

When a line of the private branch exchange number 11 is reached, part of the charge of the capacitor C11 can be utilized for the energization of the testing relay P, only when the transistor Tr is open. The opening current flows from the emitter to the base of the transistor only when the associated line circuit TSch (top right in FIG. 3c) is idle. The control current extends in the circuit:

(24)    —50 v. at the divider Wi5/Wi6, 46u, 44pu, 51se, Em/Tr, Ba/Tr, Wi3, 98se, mII, 73c, c-wiper, c15-conductor, TSch, 77rm, WiR, TN, —

The partial discharge of the capacitor C11 can now start by way of the emitter-collector of the transistor Tr and the testing relay P:

(25) C11 (+), d-wiper (15), mIII, 41u, 36d, PI, 38u, —25 v. at the divider Wi1/Wi2, exchange battery, divider Wi5/Wi6, —50 v., 46u, 44pu, 51se, Em/Tr, Ko/Tr, Gr11/3, C11 (—)

The capacitor C11 loses in this circuit half its charge, thereby causing energization of the testing relay P. This circuit is shown in FIG. 4a in prominent lines to facilitate tracing. It will be seen that discharge of the capacitor C11 over the rectifier Gr11/2 is impossible since the voltage $U_c=50$ v. at the capacitor is opposed by the exchange battery with 50 v. by way of the voltage divider Wi5/Wi6. The discharge accordingly takes place solely over the testing relay P to an idle position or line of the private branch exchange subscriber until the capacitor voltage has dropped to 25 v., at which point the exchange battery is operative with −25 v. over the voltage divider Wi1/Wi2 to prevent total discharge of the capacitor. The purpose of this partial discharge will be realized in the course of the following explanations concerning the stopping of the connector with its wipers on the last position or line of the private branch exchange subscriber. A subsequent charging of the capacitor C11 over the voltage divider Wi5/Wi6 is prevented by corresponding polarization of the rectifier Gr11/2.

The connector must be stopped at the last line of the private branch exchange subscriber range regardless of the condition of the associated line circuit, that is, the discharge of the capacitor C11 must take place independent of the transistor Tr. Therefore, if the connector does not find an idle line in the hunting with respect to the private branch exchange subscriber, a circuit will be established at the last line "04" for the capacitor C11:

(26) C11(+), Gr11/2, sa2, 92se, ground (exchange battery), Wi1, 38u, PI, 36d, 41u, mIII, d-wiper (04), C11(−)

This circuit is shown in FIG. 4b in prominent lines to facilitate tracing. It will be seen that half of the charge of the capacitor can again extend by way of the testing relay. The discharge current flows, however, in opposite direction as compared with the remaining lines of the private branch exchange number. The relay P is for this reason disposed in the diagonal branch of a Graetz circuit. The testing relay can thus be energized in both cases of testing by the discharge current flowing in different directions. The discharge circuit at the last line of the private branch exchange number is effected upon testing on the minus side or plate of the capacitor solely by the testing relay P lying on a voltage divider of −25 v. Foregoing the full discharge of the capacitor incident to the stopping of the connector with the wipers on an idle line of the desired private branch exchange subscriber provides the possibility of distinguishing the last line from the remaining lines. A full discharge of the capacitor C11 incident to the testing on the plus-side thereof would not necessitate discharge incident to testing on the minus side.

It may be mentioned at this point that the marker test relay P need not be switched to the marker circuit directly over the Graetz-rectifier circuit; in order to keep the structural elements (such as capacitors, rectifiers) in the marking circuit small, the primary winding of an impulse transformer may be placed in the marking circuit, such transformer controlling on the secondary side an amplifier circuit containing in Graetz circuit the testing relay P which is thereby energized.

Since relay U has not been energized, the testing relay P upon energizing in the setting set, will be held in series with relay PH:

(27) +, 17d, 20p, PH, PII, −

Relay PH also energizes in this circuit and connects the seizure relay C of the connector:

(28) +, 32ph, wiper mV, CI, −

Upon energizing, relay C opens its contact 1c (top left in FIG. 3b), thereby disconnnecting the relays AN and A from the incoming a2-conductor. However, relay A has already restored upon energization of relay P due to opening of contact 14p. The restoration of relay A effected release of the marker by interruption of the holding circuits of the actuated relays of the counting chain; relays D, SE and E restore at the same time.

Relay C of the connector, by opening contact 73c, interrupts the decade marking circuit and at contact 74c switches the incoming c2-conductor through to the c-wiper of the connector for the individual testing. Prior to the energization of relay C over the incoming c2-conductor, relay PH has caused energization of the seizure relay CS of the feed relay set (FIGS. 2a, 2b):

(29) +, 87ph, mIV, c2-conductor (FIG. 2), 7us, 8cs, CSII, −

Relay CS is held independently of relay US, in the circuit:

(30) +, wiper c(IIIGW), c-conductor, CSI, 9cs, CSII, −

Relay C of the connector is held over the incoming d2-conductor:

(31) (FIG. 2) +, 10cs, Wi7, d2-conductor, (FIG. 3b) 72c, CII, AD, −

The line wiper control magnet AD (top left of center in FIG. 3b) of the connector also operates in this circuit, such magnet pressing the line wipers into engagement with the corresponding bank contacts, thereby switching the two line conductors through.

Upon energization of relay CS in the relay set (FIG. 2b), relay TS (FIG. 2a) is energized:

(32) +, 10cs, 11us, 12gs, TSI, −

Relay US is after opening of contact 4cs held in the circuit:

(33) +, 14us, 15cs, USII, 13ts, −

Relay TS is held independently of relay US:

(34) +, 10cs, 16ts, 12gs, TSI, −

Responsive to actuation of relay TS, relay GS (bottom left in FIG. 2b) will energize:

(35) +, 10cs, 22zs, GrIV, 21st, CSI. −

Relay GS is held independently of relay TS in the circuit:

(36) +, 10cs, 22zs, GrIV, 23gs, GSII, GSI, −

At contact 12gs, relay GS interrupts the holding circuit of relay TS (see circuit "34") during the restoration time of relay TS, the testing relay PS (bottom right in FIG. 2b) will be connected to the outgoing conductor c2:

(37) + at upper center of FIG. 2a, 14us, 15cs, 20gs at bottom right in FIG. 2b, PSII, 17ts, PSI, conductor c2, (FIG. 3) 74c, c-wiper, (15), 77rn, WiR, TN, −

If the subscriber line 15 reached by the connector, is idle, relay PS of the feed relay set will be energized in the foregoing circuit. Relay PS, by short-circuiting the high resistance winding PSII at contact 19ps busies the seized line in usual manner against further seizure. Relay PS closes upon energization contacts 25ps and 26ps, thereby connecting the battery feed relay AS (winding IAS and IIAS; top left in FIG. 2b) for the called subscriber to the two line conductors a2, b2. The first ring is simultaneously transmitted by the relay RS (FIG. 2a) which is connected by the relay PS:

(38) +, 10cs, TSIII+II, 30ts, 29ps, RSI, 32zs, 34as, −

Relay RS connects ringing current to the upper line conductor a2 by way of its contact 28rs (top left in FIG. 2b), the ringing current flowing over the ringer of the called party and the lower line conductor b2 and contact 38as to ground at contact 25ps. The called party receives at the same time ringing tone:

(39) +, VOLU (bottom in FIG. 2a), Wi4, 41ps, 40rs, FZ, +

The ringing tone is transmitted to the calling party by way of the windings I, II of the transformer OLU. Upon restoration of relay TS, relay RS is for continuous ringing energized by a 10-sec. ringing interrupter switch indicated at left bottom of FIG. 2a:

(40) +, 10-sec., 31*ts*, 29*ps*, RSI, 32*zs*, 34*as*, —

When the called subscriber answers during a ringing pause, the battery feed relay AS will be energized:

(41) +, 25*ps*, 38*as*, conductor *b*2, subscriber loop, conductor *a*2, ASII, 26*ps*, 27*rs*, —

Relay AS by opening its contact 38*as* interrupts the short circuit for the winding I lying on the conductor *b*2 and connects the call through by closing its contacts 39*a* The connection between the two subscribers is now established.

If the testing relay PS of the feed relay set (FIG. 2*b*) does not ascertain the called line as being idle, relays PS and RS will not energize. The calling subscriber receives busy tone:

(42) +, VOLU, W*i*4, 42*ps*, 42*rs*, 44*rs*, 43*gs*, BZ, +

When the calling subscriber thereupon restores his receiver, the connection will be released. The incoming *c*-conductor is thereby interrupted from the third group selector, the holding circuit for the seizure relay CS is opened, relay CS deenergizes, interrupting the holding circuit for the relays US and GS, whereby the feed relay set is released.

The connector is released by the release the seizure relay C and the line wiper control magnet AD, responsive to disconnection of the ground potential from the conductor *d*2 at contact 10*cs* (near bottom center in FIG. 2*a*). The connector is thus again available for another call.

The operations incident to the setting of the connector in extending a call to an individual line will now be briefly described taking as an example the night-call number 12 of the private branch exchange subscriber 11.

The arrival of the tens digit 1 in the marker effects the operations already described in connection with the extension of a call to a private branch exchange number.

As can be readily seen from the table FIG. 3*a*, the units digit 2 consisting of an impulse series of two impulses causes in the marker responsive to the second impulse merely energization of relay S. The marking line 2 is accordingly switched through. The testing interval of the relay PU lapses without effect since relay SE cannot energize inasmuch as the capacitor C11 could not be charged by way of the marker line 2, thus also preventing closure of the circuit for the relay SE. Responsive to restoration of relay PU, relays E and D energize (see circuits "12" and "13") as already described. The connector starts operating and will be stopped at step 12 in the circuit:

(43) +, W*i*5, 46*u*, 44*pu*, 45*se*, 53*s*, 55*r*, 60*t*, marker conductor 2, 102*pu*, G*r*12/2, *d*-wiper (12), *m*III, 41*u*, 36*d*, PI, 38*u*, voltage divider W*i*1/W*i*2, —25

The rectifier G*r*12/1 prevents the marking of the preceding position 11. Upon actuation of relay P, relay PH will also energize. The call is extended as already described and the setting set is released.

Relay E in the setting set serves for the delayed connection of ground potential to the idle decade marking steps of the *d*-bank contact multiple of the connector in connection with the individual line control. The restoration time of the relay E responsive to energize of relay D is such that the connector in the decade setting has already left the selected marking step before ground potential over contact 42*e* is placed by way of the "gem" line on all marking positions of the *d*-bank multiple. However, this connection of the ground potential must have been effected before the next marking position is reached. The operation of the switch wipers is in this manner limited to the individual lines of the selected decade. This measure prevents wrong connections responsive to the selection of the number of a given private branch exchange line which is not connected as a night-call number.

Changes may be made within the scope and spirit of the appended claims.

We claim:

1. In a telephone system and the like, a circuit arrangement for connector switches having access to private branch exchange lines and having a plurality of auxiliary contact banks, a marker which is common to a plurality of said connector switches for controlling the operation thereof in the extension of calls, a testing relay in said marker for preparatorily marking private branch exchange group contacts in the multiple of one of said auxiliary contact banks while directly marking individual private branch exchange lines in the multiple of another auxiliary contact bank, and having circuit means for operatively releasing said marker circuit in the presence of an idle called line solely responsive to the simultaneous establishment, by said connector switch, over said one of said auxiliary contact banks, of a testing circuit extending to line circuits of a private branch exchange line involved in a call, said circuit arrangement comprising capacitors disposed in the marker multiple of the connector switch, each predetermined private branch exchange number having one of said capacitors associated therewith, with one side of the respective capacitor being operatively connected to all lines, except the last, of the private branch exchange number with which it is associated, and the other side of the respective capacitor operatively connected to the last line thereof, the respective capacitors being charged to a given potential depending upon evaluation of the private branch number so as to store such number, said connector testing on such capacitor incident to hunting over the bank contacts corresponding to the private branch number, and a device for making the marking circuit operatively effective, said device comprising means for simultaneously establishing a further circuit including an electronic amplifier for ascertaining the condition of the line to which a call is to be extended.

2. A circuit arrangement according to claim 1, comprising means for charging by way of the group marking contact bank of the connector a capacitor allotted to the lines of a desired private branch exchange number depending upon the setting of the connector responsive to the tens digit to the corresponding group contact and further by way of the corresponding marking conductor and the individual marker multiple of the connector depending upon evaluation of the units digit in the marker.

3. A circuit arrangement according to claim 2, wherein said electronic amplifier includes a transistor, comprising switching means which become operatively effective in the marker after evaluation of the tens and units digits of a private branch exchange number but prior to the corresponding setting of the connector to the first position of the marked private branch exchange number, said switching means being operative to connect the emitter-base circuit of the transistor to the individual line testing conductor while disconnecting the marking circuit of the individual lines of the private branch exchange number from the marking conductors and connecting the marking circuit solely with the charged private branch exchange line capacitor.

4. A circuit arrangement according to claim 1, wherein the decade marking circuits contain as a current source a charged capacitor disposed in the marker.

5. A circuit arrangement according to claim 1, wherein said electronic amplifier comprises a transistor for unblocking an individual testing circuit which ascertains an idle line circuit of the desired private branch exchange number, the increased current consequently flowing in the amplifier being effective to cause operative actuation of the marker test relay in the marking circuit.

6. A circuit arrangement according to claim 5, comprising means for connecting the emitter-base circuit of the transistor in the individual line testing circuit to the line circuits of the private branch exchange number, and means for connecting the emitter-collector circuit in the marking circuit extending to the marker.

7. A circuit arrangement according to claim 5, comprising means for connecting all except the last of the bank contacts of a private branch exchange number in common to one plate of the charged capacitor which is after unblocking of the marking circuit by the transistor over correspondingly polarized rectifiers partially discharged against a predetermined partial voltage by the effect of sufficient current conducted by way of the testing relay, the last bank contacts of the private branch exchange number being connected to the other plate of the capacitor and such capacitor being by way of other rectifiers and omitting said transistor again partially discharged against the same partial voltage by current of opposite direction conducted through said testing relay.

8. A circuit arrangement according to claim 7, wherein said testing relay of the marker is for the individual line marking connected at a voltage divider circuit against half of the partial voltage of the charging voltage of the private branch exchange capacitor, and wherein the marking conductors with the individual line marking multiple are connected at a voltage divider against the charging voltage of the capacitors of the private branch exchange lines.

9. A circuit arrangement according to claim 7, wherein the testing relay of the marking circuit of the marker is disposed in the diagonal branch of a rectifier bridge, the rectifiers of which are poled to effect unidirectional current flow through such testing relay irrespective of the current direction into said rectifier bridge.

References Cited in the file of this patent

UNITED STATES PATENTS

| | | |
|---|---|---|
| 2,602,122 | Lesigne | July 1, 1952 |
| 2,692,917 | Mauge | Oct. 26, 1954 |
| 2,764,635 | Lesigne | Sept. 25, 1956 |
| 2,816,171 | Geels et al. | Dec. 10, 1957 |